US009887466B2

(12) United States Patent
Ermutlu et al.

(10) Patent No.: US 9,887,466 B2
(45) Date of Patent: Feb. 6, 2018

(54) ANTENNA ARRANGEMENT FOR ORTHOGONALLY POLARIZED OMNIDIRECTIONAL TRANSMISSION

(71) Applicant: Nokia Solutions and Networks Oy, Espoo (FI)

(72) Inventors: Murat Emre Ermutlu, Helsinki (FI); Oskari Amper, Klaukkala (FI)

( * ) Notice: Subject to any disclaimer, the term of this patent is extended or adjusted under 35 U.S.C. 154(b) by 0 days.

(21) Appl. No.: 15/117,642

(22) PCT Filed: Feb. 14, 2014

(86) PCT No.: PCT/EP2014/052919
§ 371 (c)(1),
(2) Date: Aug. 9, 2016

(87) PCT Pub. No.: WO2015/120904
PCT Pub. Date: Aug. 20, 2015

(65) Prior Publication Data
US 2016/0352024 A1    Dec. 1, 2016

(51) Int. Cl.
*H01Q 21/24* (2006.01)
*H01Q 1/24* (2006.01)
(Continued)

(52) U.S. Cl.
CPC .............. *H01Q 21/24* (2013.01); *H01Q 1/24* (2013.01); *H01Q 1/242* (2013.01); *H01Q 1/246* (2013.01);
(Continued)

(58) Field of Classification Search
CPC .......... H01Q 21/24; H01Q 1/24; H01Q 1/242; H01Q 1/246; H01Q 1/48; H01Q 9/0435;
(Continued)

(56) References Cited

U.S. PATENT DOCUMENTS

| 4,527,163 A | 7/1985 | Stanton ................. 343/700 MS |
| 5,898,405 A | 4/1999 | Iwasaki ................. 343/700 MS |

(Continued)

FOREIGN PATENT DOCUMENTS

CA    2095304    10/1994

OTHER PUBLICATIONS

Quan, XuLin, et al., "A Broadband Dual-Polarized Omnidirectional Antenna for Base Stations", © 2012 IEEE, 5 pgs.
(Continued)

*Primary Examiner* — Graham Smith
(74) *Attorney, Agent, or Firm* — Harrington & Smith

(57) ABSTRACT

There is provided an antenna arrangement including at least two conductive sheet arranged around at least one ground plane for transmitting radio signals from feeder cables on a transmission frequency band such that the antenna arrangement has a substantially omnidirectional radiation pattern and the antenna arrangement is configured to polarize the radio signals from a first feeder cable horizontally in a first radiation direction of the radiation pattern, polarize the radio signals from a second feeder cable vertically in a second radiation direction of the radiation pattern, polarize the radio signals from the first feeder cable and from the second feeder cable non-linearly in other radiation directions, whereby the non-linearly polarized radio signals from the first feeder cable and the second feeder cable are substantially orthogonal.

14 Claims, 4 Drawing Sheets

(51) Int. Cl.
*H01Q 1/48* (2006.01)
*H01Q 9/04* (2006.01)
*H01Q 21/20* (2006.01)
*H01Q 21/28* (2006.01)
*H04B 7/10* (2017.01)

(52) U.S. Cl.
CPC ............. *H01Q 1/48* (2013.01); *H01Q 9/0435* (2013.01); *H01Q 9/0457* (2013.01); *H01Q 9/0471* (2013.01); *H01Q 21/205* (2013.01); *H01Q 21/28* (2013.01); *H04B 7/10* (2013.01)

(58) Field of Classification Search
CPC .. H01Q 9/0457; H01Q 9/0471; H01Q 21/205; H01Q 21/28
See application file for complete search history.

(56) References Cited

U.S. PATENT DOCUMENTS

2003/0201937 A1 10/2003 Lee .................... 343/700 MS
2005/0200535 A1 9/2005 Elkobi et al. ................ 343/702

OTHER PUBLICATIONS

Herscovici, Naftali, et al., "The Cylindrical Omnidirectional Patch Antenna", © 2001 IEEE, 8 pgs.

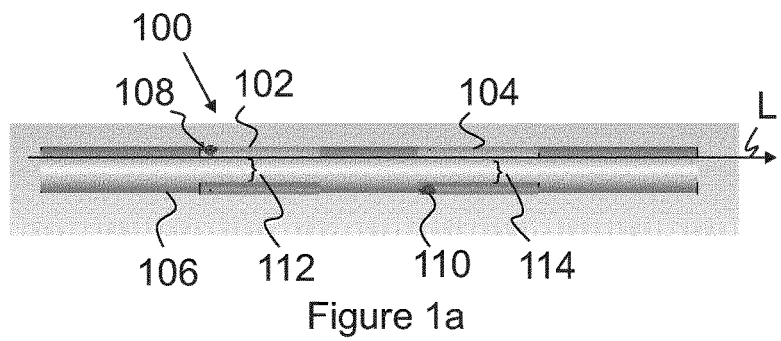
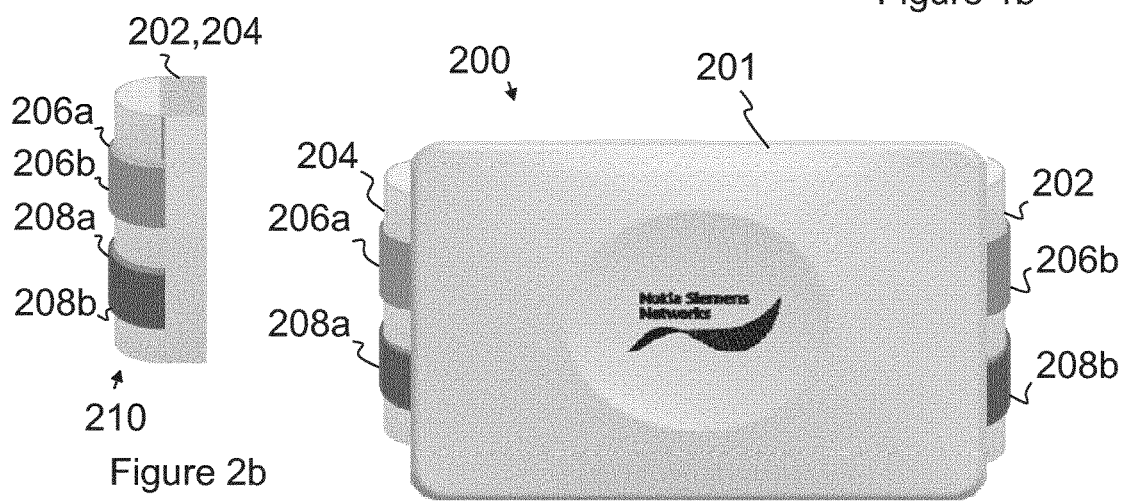
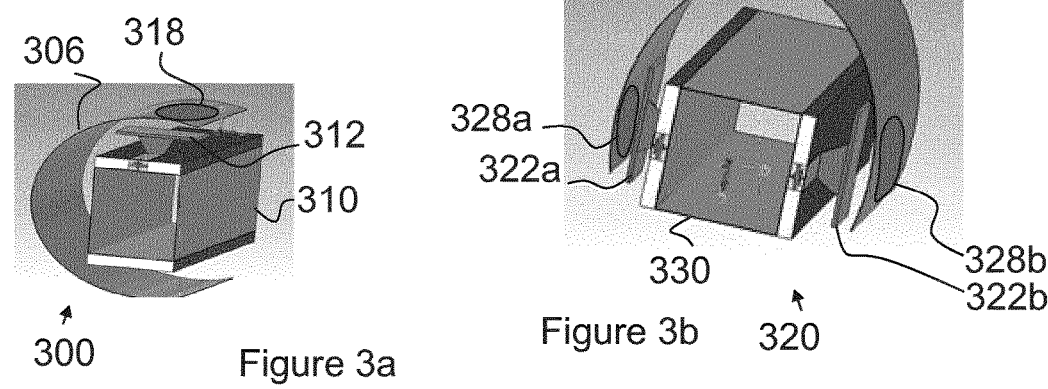

ANTENNA ARRANGEMENT FOR ORTHOGONALLY POLARIZED OMNIDIRECTIONAL TRANSMISSION

FIELD

The invention relates to an antenna arrangement for transmission of radio signals on a transmission frequency band, and particularly to an antenna arrangement comprising two conductive sheets arranged around at least one ground plane for transmitting radio signals from feeder cables on a transmission frequency band.

BACKGROUND

Microstrip antennas are relatively inexpensive to manufacture and design because of the simple 2-dimensional physical geometry. There are several types of microstrip antennas the most common of which is the microstrip patch antenna or patch antenna. A patch antenna is a narrowband, wide-beam antenna fabricated by etching the antenna element pattern in metal trace bonded to an insulating dielectric substrate, such as a printed circuit board, with a continuous metal layer bonded to the opposite side of the substrate which forms a ground plane. It is relatively easy to print an array of patches on a single substrate using lithographic techniques.

Antenna diversity, is a diversity scheme that uses two or more antennas to improve quality and reliability of transmissions on a wireless link. Antenna diversity may be implemented in a receiving system of the wireless link and/or in the transmitting system of the wireless link. Antenna diversity provides a diversity gain that is measurable e.g. by a signal to noise ratio. A particular antenna diversity scheme is polarization diversity, where a pair of antennas transmits radio signals that are orthogonally polarized.

Polarization of antenna identifies the plane in which the electric field of the antenna varies with respect to the Earth's surface. A linear polarization means that the electric field varies in one direction. The linear polarization can be a horizontal or a vertical polarization depending on the orientation of the antenna. Non-linear polarization means that electric field of the antenna varies in a direction that varies with time. Examples of the non-linear polarizations include circular polarization, where the direction of the electric field varies in the directions of the radius of a circle, and elliptic polarization, where the direction of the electric field varies between the directions of the axes of the ellipse.

Radio signals are orthogonally polarized, when the polarized radio signals may be received separately preferably with only minimal or small interference between the radio signals, e.g. a vertically polarized and a horizontally polarized radio signal.

An omnidirectional antenna has a substantially equal radiation pattern in all directions in the radiation pane of the antenna. In the paper of Saunders, W. K. "On the unity Gain Antenna" edited by E. C. Jordan, Electromagnetic Theory and Antennas Part 2, Pergamon Press, Oxford, 1963, it is proven that a "null free antenna"—meaning an antenna having no zero of radiation field over its radiation sphere, cannot have a pattern linearly polarized in all directions. Accordingly, it is difficult to design an antenna that has a substantially omnidirectional radiation pattern and maintain the linear polarization that would be preferred for polarization diversity in the antenna.

BRIEF DESCRIPTION OF SOME EMBODIMENTS

An object of the present invention is to provide an antenna arrangement, a transceiver unit, a terminal device, radio access node and communications system so as to alleviate at least part of the above disadvantages. The objects of the invention are achieved by an antenna arrangement, a transceiver unit, a terminal device, radio access node and mobile communications system which are characterized by what is stated in the independent claims. The preferred embodiments of the invention are disclosed in the dependent claims.

According to an aspect there is provided an antenna arrangement comprising at least two conductive sheets arranged around at least one ground plane for transmitting radio signals from feeder cables on a transmission frequency band such that the antenna arrangement has a substantially omnidirectional radiation pattern and the antenna arrangement is configured to polarize the radio signals from a first feeder cable horizontally in a first radiation direction of the radiation pattern, polarize the radio signals from a second feeder cable vertically in a second radiation direction of the radiation pattern, polarize the radio signals from the first feeder cable and from the second feeder cable non-linearly in other radiation directions, whereby the non-linearly polarized radio signals from the first feeder cable and the second feeder cable are substantially orthogonal.

According to an aspect there is provided a radio transceiver unit comprising a radio frequency modulation unit for generating radio frequency signals on a transmission frequency band and feeder cables connected to the radio frequency modulation unit for feeding the generated radio frequency signals to feeder sheets of the antenna arrangement according an aspect.

According to an aspect there is provided a terminal device comprising a data generation unit operatively connected to the radio transceiver unit according to an aspect for transmission of data on the transmission frequency band by an antenna arrangement according to an aspect.

According to an aspect there is provided a radio access node for a mobile communications system, comprising a transceiver unit according to an aspect for providing radio access to terminal devices of the mobile communications system.

According to an aspect there is provided a mobile communications system comprising one or more radio access nodes according to an aspect and terminal devices according to an aspect that communicate data by radio frequency signals on a transmission frequency band.

Some embodiments provide improvements comprising transmission of orthogonally polarized radio signals on a transmission frequency band on an omnidirectional radiation pattern.

Further embodiments will be apparent from the following description.

BRIEF DESCRIPTION OF THE DRAWINGS

In the following the invention will be described in greater detail by means of preferred embodiments with reference to the accompanying drawings, in which FIG. 1a illustrates an antenna arrangement according to an embodiment;

FIG. 1b illustrates a conductive sheet for an antenna arrangement according to an embodiment;

FIG. 2a illustrates an antenna arrangement installed to a radio access node according to an embodiment;

FIG. 2b illustrates a part of antenna arrangement for forming an omnidirectional antenna according to an embodiment;

FIG. 2c illustrates an antenna arrangement installed to a radio access node according to an embodiment;

FIG. 3a illustrates wireless coupling of radio to a conductive sheets in an antenna arrangement according to an embodiment;

FIG. 3b illustrates orthogonal polarization by shape of conductive sheet and wireless coupling of radio signals to the conductive sheet in an antenna arrangement according to an embodiment;

DETAILED DESCRIPTION

Various embodiments described herein provide a simple, scalable, orthogonally polarized, omnidirectional antenna arrangement that is scalable from small cell base stations to middle and large cell base stations. Manufacturing of the antenna arrangement is simple, and material cost is low. The antenna arrangement may be integrated with various products, for example radio access nodes and terminal devices, that communicate by radio frequency transmissions. Radio signal feed may be wireless to provide improved energy efficiency in the transmission of radio signals.

Various embodiments described herein provide an antenna arrangement and parts for an antenna arrangement that has a substantially omnidirectional radiation pattern and capable of transmitting orthogonally polarized radio signals on a transmission frequency band.

A conductive sheet is a thin piece of conductive material, e.g. metal, suitable for radio frequency transmission in antennas such as patch antennas.

FIG. 1a illustrates an antenna arrangement 100 according to an embodiment. The antenna arrangement comprises at least two conductive sheets 102, 104 arranged around at least one ground plane 106 for transmitting radio signals from feeder cables on a transmission frequency band such that the antenna arrangement has a substantially omnidirectional radiation pattern. The antenna arrangement is arranged to polarize the radio signals from a first feeder cable horizontally in a first radiation direction of the radiation pattern, polarize the radio signals from a second feeder cable vertically in a second radiation direction of the radiation pattern, and polarize the radio signals from the first feeder cable and from the second feeder cable non-linearly in other radiation directions, whereby the non-linearly polarized radio signals from the first feeder cable and the second feeder cable are substantially orthogonal.

Orthogonal polarization between of non-linearly polarized radio signals may be provided by a direction of movement, for example left-handed or right-handed movement, of the non-linear polarizations by time.

A feeder cable feeding a radio signal to a conductive sheet may be connected to a reception point in the conductive sheet. A separate feeder cable may be provided for feeding each conductive sheet at its reception point. The connection between the feeder cable and the reception point may be wireless for example provided by a capacitive connection. The wireless connection facilitates efficiency of transmission that may be measured by a ratio of radiated energy. The connection between the feeder cable and the reception point may be galvanic for example by soldering the feeder cable to the reception point.

Figure 11:
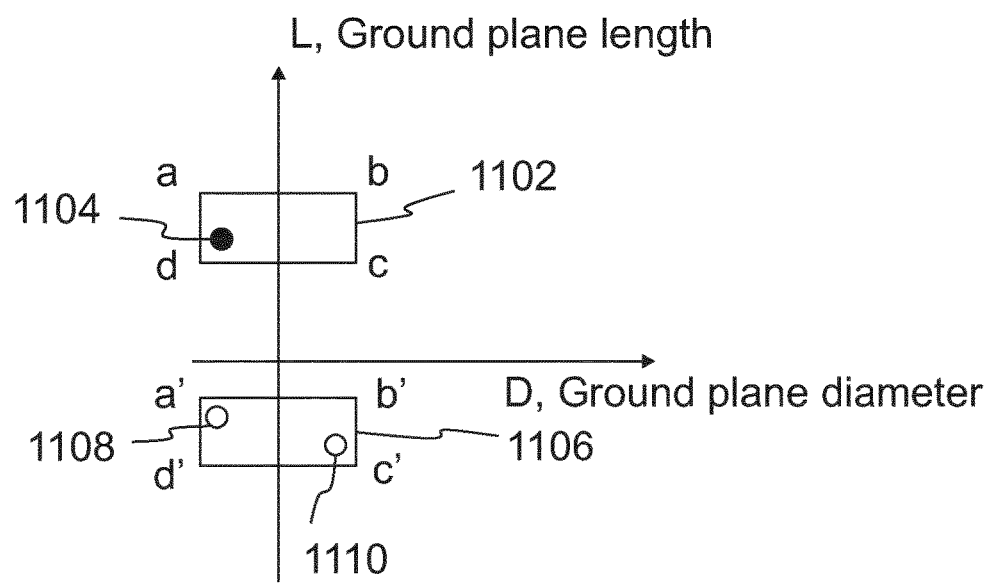
FIG. 11 illustrates positions of reception points of radio signals in conductive sheets according to an embodiment.

In an embodiment an antenna arrangement comprises at least two conductive sheets 102, 104 of the same rectangular shape and dimensions, and at least one ground plane 106 positioned with respect to the conductive sheets such that radio signals fed to the conductive sheets cause the conductive sheets to resonate and to reflect from the ground plane for transmission on a transmission frequency band, wherein the conductive sheets are curved around the ground plane and spaced apart at two positions along the ground plane, wherein the conductive sheets have reception points 108, 110 arranged at adjacent corners of the conductive sheets for receiving the radio signals. FIG. 11 describes positions of reception points of radio signals in conductive sheets in more detail.

The radio signals fed to the adjacent corners provide orthogonal polarization between the radio signals emitted from the conductive sheets.

Preferably the conductive sheets are arranged on the ground plane symmetrically with respect to each other. The symmetrical arrangement may be provided by aligning the edges of the conductive sheets with a direction 'L' of length of the ground plane. In this way two of the edges of each sheet are perpendicular to the direction of length. The symmetrical arrangement provides that the positioning of the conductive sheets to the ground plane support the orthogonal polarization provided by the positioning of the reception points in the conductive sheets. Preferably, the conductive sheets curve substantially around the ground plane that has a circular cross-section for providing a substantially omnidirectional radiation pattern. Edges of the conductive sheets may form openings 112, 114 between the edges, when the conductive sheets are round the ground plane. The openings of the conductive sheets are preferably aligned with each other in the direction of length 'L' of the ground plane for efficient orthogonal polarization. The ground plane may be an elongated object, e.g. a pipe, that is enclosed by one or more conductive sheets. The cross-section of the ground plane may also be formed as an ellipse, semi-circle, rectangular, or semi-elliptic.

FIG. 1b illustrates a conductive sheet 102, 104 for an antenna arrangement according to an embodiment. The conductive sheet has a rectangular shape. The conductive sheet is preferably dimensioned to have an edge length corresponding to a half of the wavelength of the transmission frequency. The transmission frequency may be in the Ultra High Frequency range e.g. from 0.7 to 3.0 GHz. Preferably the dimensions of the conductive sheet are determined such that it is of sufficient length to reach all the way around the ground plane for an omnidirectional radiation pattern. For a smaller radiation pattern, a smaller length of the conductive sheet may be used.

FIG. 2a illustrates an antenna arrangement installed to a radio access node 200, according to an embodiment. The antenna arrangement may be the antenna arrangement described in FIG. 1a with a difference that instead of one ground plane two ground planes are used. The antenna arrangement comprises two parallel ground planes 202, 204 each having at least two conductive sheets 206a, 206b, 208a, 208b. Polarization diversity may be provided in the parallel parts of the antenna arrangement as described in FIG. 1a. The conductive sheet may be the conductive sheet of FIG. 1b. The radio access node has a body structure 201 and the parallel parts of the antenna arrangement are installed on opposite sides of the body structure such that the body structure is between the parts. The parallel parts installed in this way provide a substantially omnidirectional radiation pattern. Moreover, the separation of the parallel parts by the body structure provides space diversity between the radio signals communicated by the separated parts. Positioning the parts of the antenna arrangement to the sides provides a robust structure for the radio access node, whereby the radio access node is less fragile and therefore suitable to be installed to locations, where it can not be protected from tampering.

The conductive sheets are curved around the ground plane in a semi-circle such that the conductive sheets of each ground plane curve towards the body structure and are positioned on the ground plane such that their positions are aligned with the conductive sheets of the other ground plane. Preferably the alignment between the ground plane and conductive sheets on one side of the body structure is a mirror image of the ground plane and conductive sheets on the other side. The curvature of the conductive sheets provides directivity of the radio signal transmitted by the antenna arrangement. The alignment between the parts of the antenna arrangement on each side of the body structure allows similar directivity for transmitted radio signals on both sides of the body structure.

FIG. 2b illustrates a part 210 of antenna arrangement for forming an omnidirectional antenna, according to an embodiment. An omnidirectional antenna preferably comprises two such parts arranged in parallel to radiate in opposite directions as described in FIG. 2a. The part includes a ground plane 202, 204 having a semi-circular cross-section and conductive sheets 206a, 206b, 208a, 208b arranged along the ground plane. The part 210 may be used in the radio access node of FIG. 2a. The parallel parts are arranged to opposite sides of the radio access node, whereby they may be used for Multiple Input Multiple Output (MIMO) transmissions according to a 4×4 MIMO scheme.

FIG. 2c illustrates an antenna arrangement installed to a radio access node 221 according to an embodiment. The radio access node may have a body structure for connecting the antenna arrangement similar to FIG. 2a. In FIG. 2c, the antenna arrangement may be the antenna arrangement described in FIG. 1a, with a difference that instead of one ground plane, two ground planes are used. Accordingly, each conductive sheet 222, 224 is positioned around its own ground plane 226a, 226b, thereby forming a single transmission element for radio signals. The transmission elements maybe installed to the radio access node for feeding radio signals for transmission. The conductive sheets of the transmission elements have reception points arranged at adjacent corners of the conductive sheets for orthogonal polarization of the radio signals similar to described in FIG. 1a. Preferably the corners are adjacent corners.

The conductive sheets may be arranged around the ground planes as described with FIG. 1a. Openings formed between edges of each of the sheets around the ground plane should be directed in the same direction, when the transmission elements area arranged parallel with respect to each other for orthogonal polarization of the radio signals. For example, the direction of the openings may be left or right. In this way orthogonal polarization of the radio signals may be supported. Also in FIG. 1a, with only one ground plane, the openings are aligned and in the same direction. In FIG. 2c, The transmission elements may be separated by a distance 'd' to provide spatial diversity in communications of the radio signals by the elements. Accordingly, the antenna arrangement is suitable to be used for MIMO transmissions according to a 2×2 MIMO scheme.

FIG. 3a illustrates wireless coupling of radio signals to a conductive sheet in an antenna arrangement according to an embodiment. The antenna arrangement may be the antenna arrangement of FIG. 1a or 2a, or a part of the antenna arrangement of FIG. 2b. A part 300 of antenna arrangement is illustrated. Two or more of the parts may be positioned with respect to each other to provide an omnidirectional radiation pattern. A conductive sheet 306 is curved around a ground plane 310 to a shape of semi-ellipse. The semi-elliptic shape allows flexibility in the antenna design at least with respect to one or more parameters including size, impedance matching, and the transmission frequency band.

The ground plane has a rectangular cross-section. Radio signal feed to the conductive sheet is arranged by wireless coupling of the radio signals from a feeder cable. The wireless coupling may be provided by a feeder sheet 312 that is connectable to the feeder cable. The coupling between the feeder sheet and the conductive sheet may be a capacitive coupling such that radio signals are coupled between the feeder sheet and a reception point 318 of the conductor sheet. Preferably the feeder cables are connected to the middle of the feeder sheets. The feeder sheets may be shaped rectangular for a close fit to the shape of the conductive sheet and the reception point in the corner of the conductive sheet. Accordingly, preferably the feeder sheet is positioned to face the corner of the conductive sheet that includes the reception point of the conductor sheet. A feeder cable may be connected on a galvanic connection to the feeder sheet. The feeder sheet may be a printed circuit board including a conductor connectable to the feeder cable. The FIG. 3a is illustrated by an example, where the conductive sheet is a semi-ellipse, but it should be appreciated that also other shapes, including circular, semi-circular and ellipse may be used depending on the implementation.

Figure 4:
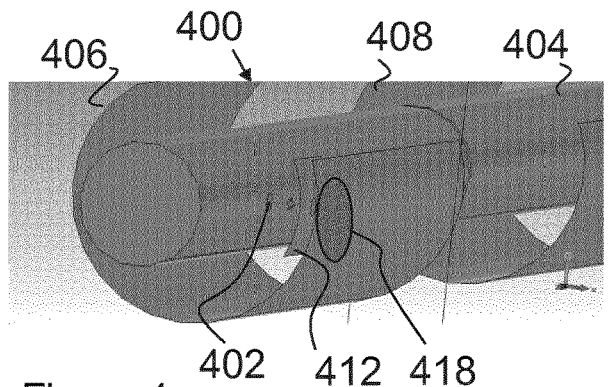
FIG. 4 illustrates an antenna arrangement for wireless coupling of radio signals between a ground plane and a conductive sheet according to an embodiment.

FIG. 3b illustrates orthogonal polarization by shape of conductive sheet 326 and wireless coupling of radio signals to the conductive sheet in an antenna arrangement 320 according to an embodiment. The antenna arrangement may be the antenna arrangement of FIG. 1a or 2a, or a part of the antenna arrangement of FIG. 2b. The conductive sheet is around the corresponding ground plane similar to described in FIG. 3a. However, as a difference to FIG. 3a, in FIG. 3b, the conductive sheet has two reception points 328a, 328b arranged at adjacent corners of the conductive sheets for receiving the radio signals for wirelessly coupling radio signals from feeder cables via feeder sheets 322a, 322b. The reception points and feeder sheets may correspond to the reception point described in FIG. 3a. The adjacent corners are preferably in adjacent ends of the semi-elliptic sheet such that their separation in distance on the sheet is large as provided by the ends being on adjacent sides of the ground plane. The semi-elliptic shape provides a larger distance between the ground plane and the conductive sheet in the middle portion of the conductive sheet than in the ends, whereby the polarization difference between the radio signals transmitted from the feeder cables may be orthogonal or at least very close to orthogonal to achieve polarization diversity. On the other hand the semi-elliptic shape of the conductive sheet provides efficient wireless coupling of the radio signals to the reception points by the conductive sheet being positioned with respect to the ground plane such that the distance between the ends and the feeder sheets is shorter than the distance between the middle portion of the conductive sheet and the ground plane. FIG. 4 illustrates an antenna arrangement 400 for wireless coupling of radio signals between a ground plane 404 and a conductive sheet 406, 408 according to an embodiment. In the antenna arrangement, a feeder cable feeding a radio signal to the conductive sheet may be led towards the conductive sheet within the ground plane. A hole 402 may be provide on the ground plane to allow the feeder cable to be led out of the ground plane and connected to a feeder sheet 412. The feeder sheet may wirelessly couple, e.g. by capacitive coupling, radio signals between the feeder cable and the conductive sheet 406. The feeder sheet is positioned to a reception point 418 in the conductive sheet. The wireless coupling and positioning of the feeder sheet may be performed as described in FIG. 3a. Each conductive sheet may have a corresponding feeder cable that is led through the ground plane and through a hole in the ground plane to the feeder sheet. One or more cables maybe led through a single hole. The feeder cable corresponding to the conductive sheet is connected to the feeder sheet.

It should be appreciated that in various embodiments a feeder cable maybe led within the ground plane towards the conductive sheet as described in FIG. 4, for wired or wireless coupling of the radio signals to the conductive sheet.

Figure 5:
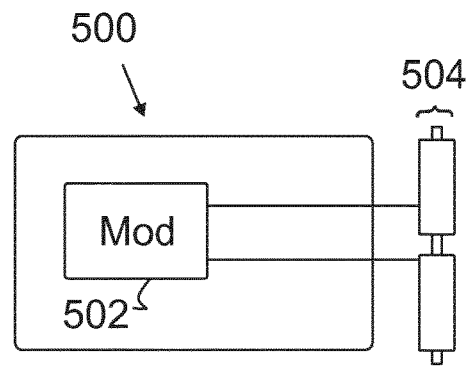
FIG. 5 illustrates a radio transceiver unit comprising an antenna arrangement according to an embodiment.

FIG. 5 illustrates a radio transceiver unit 500 comprising an antenna arrangement 504 according to an embodiment. The radio transceiver unit comprises a radio frequency modulation unit 502 for generating radio frequency signals on a transmission frequency band and feeder cables connected to the radio frequency modulation unit for feeding the generated radio frequency signals to conductive sheets of the antenna arrangement 504. The radio frequency modulation unit may perform various tasks including but not limited to baseband signal processing and modulating a signal to a transmission frequency band.

In an embodiment a radio access node may comprise the transceiver unit 500 for providing radio access to terminal devices. The transceiver unit may be installed to the body structure of FIG. 2a to provide the radio access node with a capability to transmit on radio frequencies. Examples of the radio access nodes comprise various access nodes that are capable of connecting terminal devices to a communications network, e.g. IEEE 802.11 based Wireless Local Area Network, a Global System for Mobile Communications, $3^{rd}$ and $4^{th}$ generation mobile communications systems and the internet. In the various communications systems the access nodes are referred to as an access point, a base station, a NodeB, and evolved NodeB. The antenna arrangement may be implemented for different communications networks according to their requirements, e.g. requirements regarding the transmission frequency band. The dimensions of the conductive sheets may be defined such that the antenna is matched to the transmission frequency of the communications network.

Figure 6:
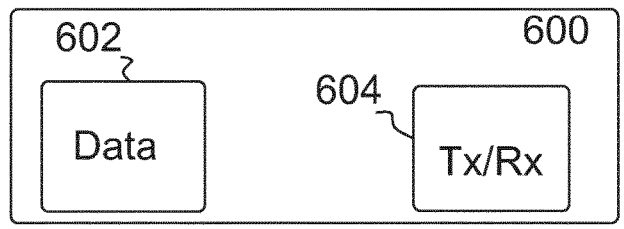
FIG. 6 illustrates a terminal device according to an embodiment.

FIG. 6 illustrates terminal device 600 comprising a data generation unit 602 operatively connected to a radio transceiver unit 604 according to an embodiment for transmission of data on the transmission frequency band by an antenna arrangement. Examples of the terminal device comprise a mobile phone and a tablet computer. The data generation unit may include a controller, e.g. a processor that obtains data from the user of the terminal and/or applications executed on the terminal device. The data may comprise voice, video and/or messages.

An embodiment comprises a mobile communications system comprising one or more radio access nodes and terminal devices. The radio access nodes and terminal devices communicate data by radio frequency signals transmitted on the transmission frequency band by an antenna arrangement according to an embodiment. The terminal devices and radio access node may be as described in FIGS. 6 and 5.

Figure 7:
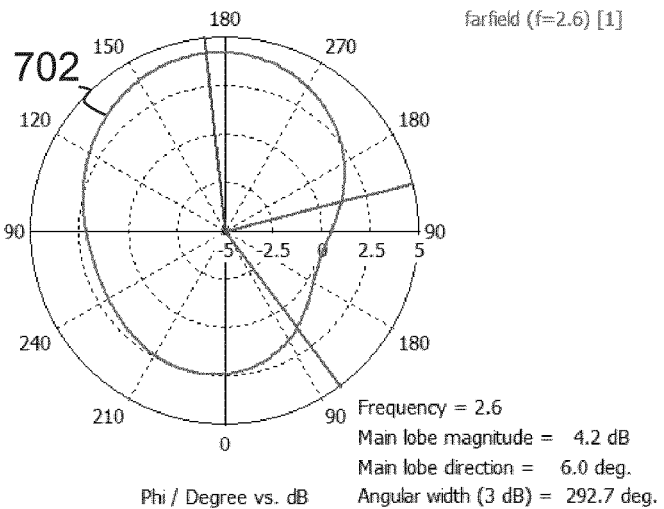
FIGS. 7, 8 and 9 illustrate characteristics of an antenna arrangement according to an embodiment.
Figure 8:
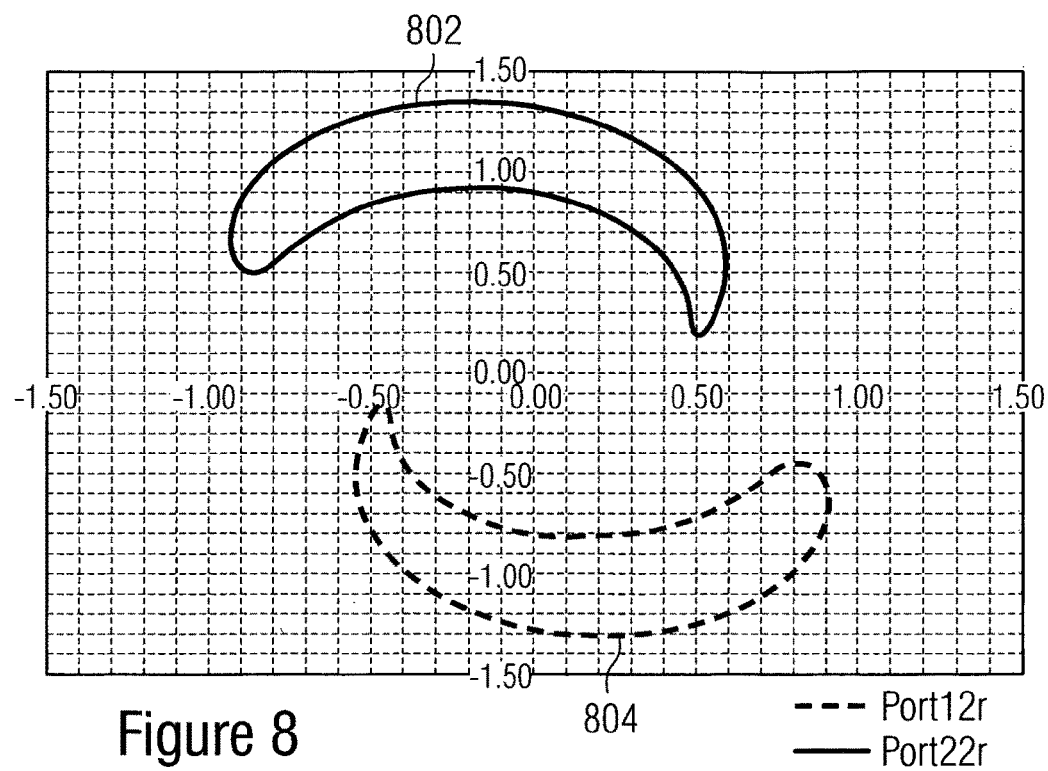
Figure 9:
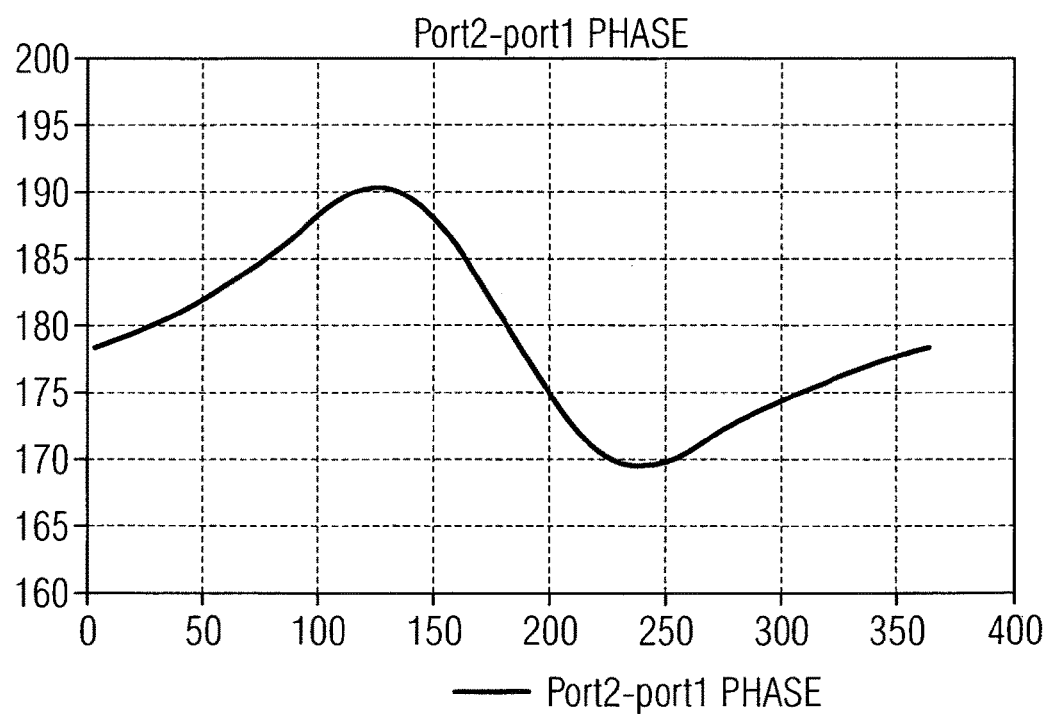

FIGS. 7, 8 and 9 illustrate characteristics of an antenna arrangement illustrated in FIG. 1a. The characteristics are results from simulation of the antenna arrangement. Feeder cables are connected to corners of the conductive sheets like it is +/−45 degree linear polarized antenna. The antenna arrangement is constructed to match the antenna arrangement to a transmission frequency of 2,752 GHz. Other frequencies may be matched by adjusting the dimensions of the conductive sheets.

FIG. 7 illustrates radiation pattern 702 of the of the antenna arrangement. The radiation pattern has no nulls, whereby it provides omnidirectional gain on the transmission frequency band.

FIG. 8 illustrates polarization ratio of the antenna arrangement. The polarization ratio is illustrated by curves 802, 804 corresponding to polarized radio signals transmitted by the antenna arrangement. The polarized radio signals is provided by the separate conductive sheets fed from the feeder cables, as described in FIG. 1a. The curves are plotted on a complex polarization ratio plane, where X-axis is real part and Y-axis is imaginary part of complex polarization ratio. When Y-axis is zero the polarization is linear, wherein the polarization of the radio signals is: (1,0)=+45, (−1,0)=−45. When X-axis is 0: (0,1), the radio signal is left handed circularly polarized (LHCP), and (0,−1), the radio signal is right handed circularly polarized (RHCP). When imaginary part is positive it is left hand sense, and when negative it is right hand sense polarized. Accordingly, the polarization of the radio signals is always different and in every direction of radiation pattern polarization is different: +/−45 linear polarization, RHCP, LHCP.

FIG. 9 illustrates a phase difference between polarized radio signals transmitted from the antenna arrangement. The radio signals are polarized by separate conductive sheets as described in FIG. 1a. The phase difference between the polarized radio signals is 180 degrees +/−10 degrees. Thereby the radio signals cause very small interference to each other and the polarization is sufficient for separation of the radio signals at reception, whereby the radio signals are orthogonally polarized.

Figure 10A:
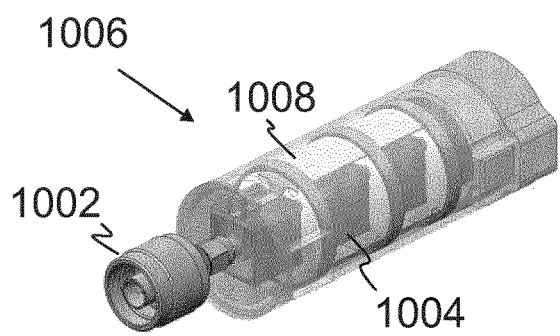
FIG. 10a wireless coupling of radio signals from a feeder cable to a conductive sheet in an antenna arrangement according to an embodiment.

FIG. 10a wireless coupling of radio signals from a feeder cable to a conductive sheet in an antenna arrangement 1006 according to an embodiment. The conductive sheet may be arranged around a ground plane 1004 as described in various embodiments herein. The feeder cable may be connected to a connector 1002 for transmission of radio signals from the feeder cable to a feeder sheet 1008 for wireless coupling of the radio signals to the conductive sheet. The wireless coupling may be arranged as described in FIG. 3a or 3b.

Figure 10B:
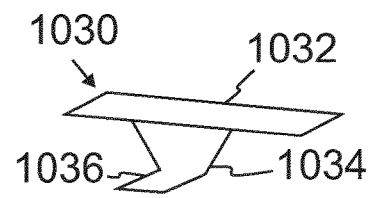
FIG. 10b illustrates a feeder sheet for wireless coupling of radio signals according to an embodiment.

FIG. 10b illustrates a feeder sheet 1030 according to an embodiment. The feeder sheet may be used for wireless coupling of radio signals to a conductive sheet in various embodiments described above. The feeder sheet operates as a transmission line of radio signals for wireless coupling of radio signals to the conductive sheet. The feeder sheet may be the feeder sheet 312, 322a, 322b, 1008 in the antenna arrangements 300, 320, and 1006 in FIG. 3a, 3b or 10a. The transmission line is preferably of electrically conductive material.

The feeder sheet comprises an intermediate portion 1034 that extends between an end 1036 of the feeder sheet in the direction of the feeder cable, and an end 1032 of the feeder sheet that is arranged for wireless coupling of radio signals to the conductive sheet. Accordingly, radio signals travel through the conductive sheet from the end towards the feeder cable to the end of the feeder sheet that wirelessly couples the radio signals to the conductive sheet. The wireless coupling may be capacitive coupling capacitive coupling. The capacitive coupling may be arranged by extending the feeder sheet in a direction of the ground plane of the conductive sheet such that one side of the feeder sheet is facing the conductive sheet. This is illustrated in FIGS. 3a, 3b and 10a for example. The feeder sheet faces the conductive sheet preferably for substantially the whole length of the conductive sheet in the direction of the ground plane. In one example the end of the feeder sheet towards the feeder cable may be provided on a Printed Circuit Board (PCB) and the intermediate portion of the feeder sheet extends from the PCB towards the conductive sheet, e.g. in a direction that is perpendicular to a direction of length of the ground plane. Accordingly, an intermediate portion in a feeder sheet runs in a vertical direction, when the ground plane extends to a horizontal direction. In this way the feeder sheet may be positioned at a distance of wireless coupling to the conductive sheet. At this distance, the end of the feeder sheet used for the wireless coupling may extend in the direction of the ground plane for capacitive coupling of the radio signals.

FIG. 11 illustrates positions of reception points 1104, 1108, 1110 of radio signals in conductive sheets 1102, 1106 according to an embodiment. The reception points may be located in conductive sheets in an antenna arrangement described above. The conductive sheets are of the same rectangular shape and they are illustrated unwrapped, e.g. before they are arranged around a ground plane. The conductive sheets may be arranged around a common ground plane, e.g. in FIG. 1a, or separate ground planes may be used, e.g. in FIG. 2c. The positions of the reception points is explained with reference to a direction 'L' of length of the ground plane and the direction 'D' of the diameter of the cross-section of the ground plane.

In the upper conductive sheet 1102, the reception point 1104 is positioned to a lower left corner. Then, in an antenna arrangement according to an embodiment, the reception point of the other conductive sheet 1108 is positioned to a corner on the other conductive sheet, which is adjacent to a corner that corresponds to corner used for the reception point in the upper conductive sheet. The corresponding corners may be determined on the basis of the shapes of the conductive sheets that are the same and both aligned to at least one or both of the 'L' and 'D' directions. Then, each corner may be defined e.g. by an angle with respect to a geometrical center of the conductive sheet.

In FIG. 11, the corners a, b, c and d in the upper conductive sheet have corresponding corners indicated in the other conductive sheet by the same letter, i.e. a', b', c', d'. Accordingly, in the upper conductive sheet the reception point is positioned to the corner d, whereby the corresponding corner in the other conductive sheet is the corner d'. Adjacent corners to the corner d' are a' and c' that should be used for the reception point in the other conductive sheet for orthogonal polarization of radio signals in the antenna arrangement. Accordingly, the corners used for reception points in the conductive sheets should be separated by a 90 degrees difference.

It should be appreciated that while some embodiments are described with wireless coupling of radio signals from feeder cables to conductive sheets, wired coupling, e.g. by soldering a feeder cable to the reception point in the conductive sheet, may also be used depending on implementation.

It should be appreciated that while some embodiments are described having a specific shape of the conductive sheet around a ground plane, also other shapes described in the embodiments may be used depending on implementation. A circular shape provides a more uniform directivity for the transmitted radio signal than an elliptic shape. Similarly, an antenna arrangement having two or more parts of the antenna arrangement implemented having one or more conductive sheets of a semi-circular or semi-elliptic shape around a ground plane, the directivity of the semi-elliptic conductive sheets is greater than the directivity of the semi-circular shaped conductive sheets.

Various embodiments described above may be combined with each other to arrive in a combination that includes structural and/or functional features from more than one embodiment of the various embodiments. When combining the embodiments, the skilled person can replace corresponding structures between the various embodiments to achieve an effect provided by an embodiment.

It will be obvious to a person skilled in the art that, as the technology advances, the inventive concept can be implemented in various ways. The invention and its embodiments are not limited to the examples described above but may vary within the scope of the claims.

The invention claimed is:

1. An antenna arrangement comprising:
   at least two conductive sheets arranged around at least one ground plane for transmitting radio signals from feeder cables on a transmission frequency band such that the antenna arrangement has a substantially omnidirectional radiation pattern and the antenna arrangement is configured to:
   polarize the radio signals from a first feeder cable horizontally in a first radiation direction of the radiation pattern;
   polarize the radio signals from a second feeder cable vertically in a second radiation direction of the radiation pattern;
   polarize the radio signals from the first feeder cable and from the second feeder cable non-linearly in other radiation directions, whereby the non-linearly polarized radio signals from the first feeder cable and the second feeder cable are substantially orthogonal.

2. An antenna arrangement according to claim 1, comprising:
   two parallel ground planes each having a conductive sheet of the same rectangular shape and dimensions curved around the corresponding ground plane in a semi-ellipse such that radio signals fed to the conductive sheets cause the conductive sheets to resonate and reflection of the radio signals from the ground plane for transmission on a transmission frequency band, wherein a body structure is arranged between the ground planes such that the conductive sheets of each ground plane curve towards the body structure and are positioned on the ground plane such that their positions are aligned with the conductive sheets of the other ground plane, wherein each of the conductive sheets have two reception points arranged at adjacent corners on opposite sides of the ground plane of the conductive sheets for receiving the radio signals.

3. An antenna arrangement according to claim 1, comprising:
at least two conductive sheets of the same rectangular shape and dimensions, and at least one ground plane positioned with respect to the conductive sheets such that radio signals fed to the conductive sheets cause the conductive sheets to resonate and reflection of the radio signals from the ground plane for transmission on a transmission frequency band, wherein the conductive sheets are curved around the ground plane and spaced apart at two positions along the ground plane, wherein the conductive sheets have reception points arranged at adjacent corners of the conductive sheets for receiving the radio signals.

4. An antenna arrangement according to claim 3, wherein the conductive sheets curve substantially around the ground plane that has a circular cross-section.

5. An antenna arrangement according to claim 3 wherein the antenna arrangement comprises two parallel ground planes each having at least two conductive sheets, wherein a body structure is arranged between the ground planes and the conductive sheets are curved around the ground plane in a semi-circle such that the conductive sheets of each ground plane curve towards the body structure and are positioned on the ground plane such that their positions are aligned with the conductive sheets of the other ground plane.

6. An antenna arrangement according to claim 3, wherein the cross-sections of the ground planes are semi-circles, semi-ellipses, circles or rectangles.

7. An antenna arrangement according to claim 2, wherein the reception points are arranged for wireless coupling of radio signals from feeder cables to the conductive sheets.

8. An antenna arrangement according to claim 7, wherein the wireless coupling comprises feeder sheets connectable to feeder cables of the radio signals, each feeder sheet arranged for capacitive coupling of radio signals between the feeder sheet and the reception point of one of the conductor sheets, wherein the feeder cables are connected to the middle of the feeder sheets.

9. An antenna arrangement according to claim 8, wherein a feeder sheet is rectangular and positioned to face the corner that includes a reception point of the conductor sheet.

10. An antenna arrangement according to claim 1, comprising feeder cables for feeding the radio signals to the conductive sheets, said feeder cables extending within the ground plane towards the conductive sheets via at least one hole in the ground plane hole for feeding the radio signals out of the ground plane towards the conductive sheets.

11. An antenna arrangement according to claim 1, wherein a non-linear polarization comprises at least one of circular and elliptic polarization, and the orthogonal polarization is provided by a direction of movement, for example left-handed or right-handed movement, of the non-linear polarizations by time.

12. A radio transceiver unit comprising a radio frequency modulation unit for generating radio frequency signals on a transmission frequency band and feeder cables connected to the radio frequency modulation unit for feeding the generated radio frequency signals to feeder sheets of the antenna arrangement according to claim 1.

13. A terminal device comprising a data generation unit operatively connected to the radio transceiver unit according to claim 12 for transmission of data on the transmission frequency band by the antenna arrangement.

14. A radio access node for a mobile communications system, comprising a transceiver unit according to claim 12 for providing radio access to terminal devices of the mobile communications system.

* * * * *